(12) United States Patent
Sadovsky

(10) Patent No.: US 8,793,273 B1
(45) Date of Patent: Jul. 29, 2014

(54) PARSING FRAMEWORK METHOD AND DEVICE

(75) Inventor: Adam Sadovsky, Mountain View, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 13/172,703

(22) Filed: Jun. 29, 2011

(51) Int. Cl.
*G06F 7/00* (2006.01)
*G06F 17/30* (2006.01)

(52) U.S. Cl.
USPC ......................................................... 707/769

(58) Field of Classification Search
USPC ......................................................... 707/769
See application file for complete search history.

(56) References Cited

U.S. PATENT DOCUMENTS

| | | | | |
|---|---|---|---|---|
| 2002/0143815 A1* | 10/2002 | Sather | ........................... | 707/513 |
| 2005/0097454 A1* | 5/2005 | Kinno et al. | ................... | 715/513 |
| 2007/0130508 A1* | 6/2007 | Gibbins | ......................... | 715/513 |
| 2008/0098008 A1* | 4/2008 | Eid | .............................. | 707/100 |
| 2009/0132528 A1* | 5/2009 | Albornoz et al. | .................. | 707/5 |
| 2010/0228693 A1* | 9/2010 | Dawson et al. | .................. | 706/12 |
| 2010/0250551 A1* | 9/2010 | Kamimura et al. | ........... | 707/741 |

* cited by examiner

*Primary Examiner* — Kimberly Wilson
(74) *Attorney, Agent, or Firm* — Middleton Reutlinger

(57) ABSTRACT

The present invention relates to generating a parser for and to parsing a web page to generate a list of one-to-one relationships, such as parsing a publically available Twitter page to generate a list of followers and a list of photographs or a publically available list of what is "happening now at the Nation" on the music web site ReverbNation. More generally, it relates to a parser that takes parsing instructions from a declaratory template. The declaratory template used to generate lists can be as simple as specifying pattern matches for a subject, predicate and object. In alternative implementations, specification of a predicate could be omitted, if only one type of list were being generated. In other alternative implementations, a string user text can be specified. Another option is to specify annotations to relations, which can be literally annotated or extracted using a pattern match specification. Cardinality of the subject and object can be specified. Multiple declaratory templates can be used to extract multiple lists from the same web page. Query group statements can be used to set a scope in which subject and object pattern matches must occur in order to emit a relationship.

23 Claims, 6 Drawing Sheets

FIG. 4

```
<div id="following">
    <h2 class="sidebar-title" id="fm_menu"><span>Following</span></h2>
<div class="sidebar-menu">
<div id="following_list">             513
              521              523                              533
    <span class="vcard">
    <a href="/PaulGAllen" class="url" hreflang="en" rel="contact"
title="Paul Allen"><img alt="Paul Allen" class="photo fn"
height="24" src="http://a1.twimg.com/profile_images/95218752/
pallen_mini.jpg" width="24" />
    </a>                531
    </span>
```

FIG. 5

```
parser_defs {
  parser_name: "twitter"
  url_regexp: "^http://(:?[^/]+\\.)?twitter\\.[^/]+/"

QueryDefs                 ___— 610 query_group_defs {   __— 611              ___— 613
    name: "friend"
    query_components: "//div[@id='following_list']/span"

query_defs {       ___— 621
      name: "url"
      query: "/a/@href"    ___— 623
    }
    query_defs {       ___— 631
      name: "photo"
      query: "/a/img/@src"    ___— 633
    }
  }

Relations —— 640 relation_tmpls {        ___— 641
    subject: "%url%"       ___— 643
    predicate: "contact"    ___— 645
    object: "%friend.url%"

subject_cardinality: ONE   ___— 647
    object_cardinality: MANY   ___— 648
    userdata: "edge"
  } relation_tmpls {          __/ 651
    subject: "%friend.url%"   ___— 653
    predicate: "photo"
    object: "%friend.photo%"   ___— 655 subject_cardinality: MANY   ___— 657
    object_cardinality: MANY   ___— 658
    userdata: "attr"
  }
```

FIG. 6

```
url: "http://twitter.com/billgates"
parser_outputs {
  parser_name: "twitter"
  relations {                                        ─ 741
    subject: "http://twitter.com/billgates"  ── 743
    predicate: "contact"                     ─────── 745
    object: "http://twitter.com/PaulGAllen"
    userdata: "edge" ──────── 748
  }
  relations {                                ─ 751
    subject: "http://twitter.com/PaulGAllen"
                                              ── 753      ─ 755
    predicate: "photo" ──────────────────────
    object: "http://a1.twimg.com/profile_images/95218752/
pallen_mini.jpg"
    userdata: "attr" ─────── 758
  }
```

FIG. 7

```
<div>
  <span class="name1">Adam</span> played ───── 841
                                          ── 843
  <span class="activity">soccer</span> with
                                          ── 845
  <span class="name2">George</span> on ─────── 846
  <span class="date">2011-03-31</span> ─────
</div>
<div>
                                          ── 851
  <span class="name1">Susan</span> played──
                                          ── 853
  <span class="activity">golf</span> with──
                                          ── 855
  <span class="name2">John</span> on ───────── 856
  <span class="date">2011-04-14</span> ─────
</div>
```

FIG. 8

```
RelationTemplate {                                ─ 941
  subject: "//span[@class='name1']"       ──── 943
  predicate: "//span[@class='activity']" ──── 945
  object: "//span[@class='name2']"       ──── subject_cardinality: MANY          ──────── 947
  object_cardinality: MANY
}
```

FIG. 9

```
parser_defs {
  parser_name: "annotations_simple"
  url_regexp: "^http://annotations.com/"
                            ╱─1010
  query_group_defs {
    name: "v" ──1011 query_components: "//table"
    query_components: "/tr"

query_defs {          ╱─1021
      name: "fruit"
      query: "/td[@class='v_fruit']"
    }
    query_defs {
      name: "date" ╱─1031
      query: "/td[@class='v_date']"
    }
    query_defs {
      name: "rating" ╱─1041
      query: "/td[@class='v_rating']"
    }
  }

# ONE-MANY-MANY ──1050
  relation_tmpls {
    subject: "//div[@id='name']"
    predicate: "ate"
    object: "%v.fruit%"

subject_cardinality: ONE
    object_cardinality: MANY annotation_tmpls {
      name: "date"
      value: "%v.date%"
      value_cardinality: MANY
    }
    annotation_tmpls {
      name: "rating"
      value: "%v.rating%"
      value_cardinality: MANY
    }
  }

# MANY-MANY-MANY ──1060
  relation_tmpls {
    subject: "%v.fruit%"
    predicate: "date"
    object: "%v.date%"

subject_cardinality: MANY
    object_cardinality: MANY annotation_tmpls {
      name: "rating"
      value: "%v.rating%"
      value_cardinality: MANY
    }
  }

# MANY-MANY-ONE ──1070
  relation_tmpls {
    subject: "%v.date%"
    predicate: "fruit"
    object: "%v.fruit%"

subject_cardinality: MANY
    object_cardinality: MANY annotation_tmpls {
      name: "name"
      value: "//div[@id='name']"
      value_cardinality: ONE
    }
  }
}
```

FIG. 10

```
parser_outputs {
  parser_name: "annotations_simple"
  relations {
    subject: "Adam"
    predicate: "ate"
    object: "Apple"
    annotations {
      name: "date"
      value: "2002"
    }
    annotations {
      name: "rating"
      value: "4"
    }
  }
  relations {
    subject: "Adam"
    predicate: "ate"
    object: "Banana"
    annotations {
      name: "date"
      value: "2003"
    }
  }
  relations {
    subject: "Adam"
    predicate: "ate"
    object: "Cherry"
    annotations {
      name: "date"
      value: "2003"
    }
    annotations {
      name: "rating"
      value: "4"
    }
  }
  relations {
    subject: "Adam"
    predicate: "ate"
    object: "Durian"
    annotations {
      name: "rating"
      value: "5"
    }
  }
```
⎫
⎬ 1150
⎭

```
  relations {
    subject: "Apple"
    predicate: "date"
    object: "2002"
    annotations {
      name: "rating"
      value: "4"
    }
  }
  relations {
    subject: "Banana"
    predicate: "date"
    object: "2003"
  }
  relations {
    subject: "Cherry"
    predicate: "date"
    object: "2003"
    annotations {
      name: "rating"
      value: "4"
    }
  }
```
⎫
⎬ 1160
⎭

```
  relations {
    subject: "2002"
    predicate: "fruit"
    object: "Apple"
    annotations {
      name: "name"
      value: "Adam"
    }
  }
  relations {
    subject: "2003"
    predicate: "fruit"
    object: "Banana"
    annotations {
      name: "name"
      value: "Adam"
    }
  }
  relations {
    subject: "2003"
    predicate: "fruit"
    object: "Cherry"
    annotations {
      name: "name"
      value: "Adam"
    }
  }
}
```
⎫
⎬ 1170
⎭

FIG. 11

PARSING FRAMEWORK METHOD AND DEVICE

BACKGROUND OF THE INVENTION

The present invention relates to generating a parser for and to parsing a web page to generate a list of one-to-one relationships, such as parsing a publically available Twitter page to generate a list of followers and a list of photographs or a publically available list of what is "happening now at the Nation" on the music web site ReverbNation. More generally, it relates to a parser that takes parsing instructions from a declaratory template. The declaratory template used to generate lists can be as simple as specifying pattern matches for a subject, predicate and object. In alternative implementations, specification of a predicate could be omitted, if only one type of list were being generated. In other alternative implementations, a string user text can be specified. Another option is to specify annotations to relations, which can be literally annotated or extracted using a pattern match specification. Cardinality of the subject and object can be specified. Multiple declaratory templates can be used to extract multiple lists from the same web page. Query group statements can be used to set a scope in which subject and object pattern matches must occur in order to emit a relationship.

Users of web sites on the Internet and of databases containing hierarchically structured documents in a markup language frequently use scrapers to extract data from web pages and structured documents. For web pages, scraper code generators often are cumbersome and require fairly extensive knowledge of the language in which the scraper code is generated to make the scraper work. For XML and similar documents, complex navigation of DOM trees is often required to extract data from structured documents.

An opportunity arises to simplify extraction of data from hierarchically structured documents using a better, more easily configured and controlled parsing tool.

SUMMARY OF THE INVENTION

The present invention relates to generating a parser for and to parsing a web page to generate a list of one-to-one relationships, such as parsing a Twitter page to generate a list of followers and a list of photographs. More generally, it relates to a parser that takes parsing instructions from a declaratory template. The declaratory template used to generate lists can be as simple as specifying pattern matches for a subject, predicate and object. In alternative implementations, specification of a predicate could be omitted, if only one type of list were being generated. In other alternative implementations, a string user text can be specified. Another option is to specify annotations to relations, which can be literally annotated or extracted using a pattern match specification. Cardinality of the subject and object can be specified. Multiple declaratory templates can be used to extract multiple lists from the same web page. Query group statements can be used to set a scope in which subject and object pattern matches must occur in order to emit a relationship. Particular aspects of the present invention are described in the claims, specification and drawings.

BRIEF DESCRIPTION OF THE DRAWINGS

FIG. 4 partially reproduces Bill Gates's Twitter page for use in a working example of technology disclosed.

FIG. 5 is an HTML fragment that includes the beginning of the "following_list" and a "vcard" for Gates's co-founder Paul Allen.

FIG. 6 includes an exemplary QueryDefs and Relations.

FIG. 7 shows a pair of one-to-one item lists for Paul Allen's contact URL and his photo, from Bill Gates's Twitter page.

FIGS. 8-9 provide a second example, in which an XPath search pattern is used to select a predicate.

FIGS. 10-11 illustrate an annotation feature of this technology. FIG. 10 is a declaratory parser definition that can be applied to the sample data, producing the exemplary output in FIG. 11.

DETAILED DESCRIPTION

Figure 1:
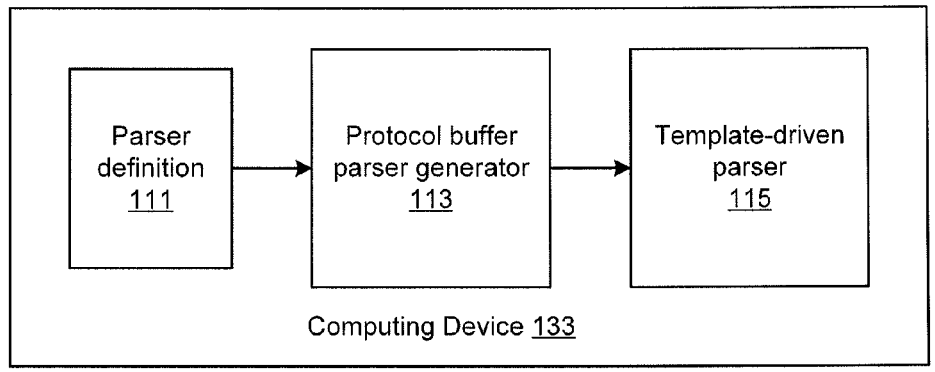
FIG. 1 is a high-level block diagram of the flow and devices that process the code fragments discussed below.

The following detailed description is made with reference to the figures.

Preferred embodiments are described to illustrate the present invention, not to limit its scope, which is defined by the claims. Those of ordinary skill in the art will recognize a variety of equivalent variations on the description that follows.

In this document we describe generating a parser for and parsing a web page to generate one or more lists of one-to-one relationships, such as parsing a Twitter page to generate a list of followers and a list of member photographs. This is a very specific kind of parsing or scraping to extract data. It applies to web pages, to XML documents and generally to hierarchically structured documents that use tagged elements and tagged, nested elements.

Many applications can benefit from extracting data from web pages with known structure, typically via a document parser of some kind. At a high level, a document parser scans the content of a document and emits zero or more bits of data derived in some fashion from the contents or properties of the document. Parsers are responsible for extracting information from publicly accessible web pages of various third-party social networking services. The extracted information includes attributes and edges specified via XFN markup, FOAF markup, or another standard markup, and other domain-specific data. For domain-specific data (e.g., number of Twitter followers listed on a Twitter profile page) engineers write and maintain custom code to extract the desired data from the underlying HTML/XML.

The incumbent parsers for extracting/parsing data out of web documents provide a framework that is cumbersome and difficult to maintain or extend. Implementing a new parser within this framework requires a non-trivial amount of effort. The technology disclosed makes it significantly easier to write, understand, and maintain a set of document parsers.

This framework uses a matching template. This template design can, for example, generate a list of photos based on a selection specification as simple as:

```
relation_tmpls{
    subject: "/a/@href"
    [[predicate: "photo"]]
    object: " /a/img/@src"
    [[subject_cardinality: MANY
    object_cardinality: MANY
    userdata: "attribute"]]
}
```

This template includes XPath matching patterns for a subject and object. A template-driven parser uses this specification to extract a list of one-to-one relationships. This particular search template could be applied to a Twitter page to extract a list of photos or images, one photo per person referenced.

In an alternative implementation, this matching template technology could be applied without specification of a predicate, cardinality or userdata, as indicated by the [[double brackets]]. A predicate could be omitted if only one list of relationships was compiled and no predicate was required to distinguish among lists. When multiple lists can be emitted during parsing, the predicate is a preferred place to specify the relationship between subject and object. Userdata is optional and useful to improve human readability of output data. Cardinality could be omitted if default cardinality were established, such as ONE subject and MANY objects, which describes Twitter followers of a particular member. Not shown, but discussed below, annotations to emit also could be specified in a relation template.

A predicate is useful when multiple templates are being applied to generate multiple lists, such as a list of followers of a Twitter member with a list of photos attributed to the Twitter member and followers. For these lists, the predicates "photo" and "contact" literally repeated in the output stream make it easy for a person to read out list membership of any one-to-one relationship. Alternatively, a predicate could be used to name separate output streams and different lists could be streamed to different files or memory locations. More on predicates later.

A userdata field can be used in arbitrary ways. Building on the Twitter example, relationships between the Twitter member and followers could be labeled "edge," as in a graph. Attributes of a single member or follower could be labeled "attribute."

This matching template can be extended by a feature that defines a matching scope. Consider the following hierarchical document example with three <div> segments found within two paragraph <p> segments. One <div> includes a subject belonging to class "name" and an object belonging to class "fruit;" another includes only a subject; the third includes only an object:

```
<p>
   <div>
      <span class="name">Adam</span> //both subject and object
      <span class="fruit">Apple</span>
   </div>
   <div>
      <span class="name">Bob</span> //just subject
   </div>
</p>
<p>
   <div>
      <span class="fruit">Cranberry</span> //just object
   </div>
</p>
```

Without consideration of scope, the second fruit "Cranberry" could be matched with the second name "Bob," even though they are in distinct paragraphs and div's.

To constrain matching and generation of one-to-one relationship records, a matching template can be given a scope specification, restricted, for instance, by the XPath expression "//p[i]/div[j]/span[@class="name"]". Applying this scope definition, the parser processes the RelationTemplate by first determining how many <p>'s there are, and then for each <p>, how many <div>'s are in that <p>, and then for each <div>, the parser will search for span[@class="name"] and span[@class="fruit"]. In this specified search scope, "Bob" does not match "Cranberry."

As explained below, scope restriction is usefully defined in a QueryGroupDef. (Def is short for definition.) Alternatively, it could be defined as a proximity operator, in the manner that Dialog, Lexis, and dtSearch use proximity search operators. From this example, one can see that a proximity operator usefully would be a multi-level operator, to handle nested structures. The disclosure that follows concentrates on the QueryGroupDef implementation of scope specification, but it should be remembered that a proximity operator is a disclosed alternative. FIG. 6 includes an exemplary query_group_defs 610, which is explained below.

The relationship template above also specifies cardinality of subject and object. The cardinality values implemented are ONE and MANY. Specifying cardinality of ONE means that zero or one instance is expected to be found, but not many within a particular scope. The emission of relation matches depends on the cardinality of both subject and object. That is, whether both are ONE, both are MANY or there is a mix of ONE and MANY. When ONE and MANY are mixed, for instance ONE subject and MANY objects: matching zero subjects will result in no relations being emitted; matching one subject will result in zero or more relations being emitted, depending on the number of objects; matching two or more subjects in a particular scope raises an error condition and presents a document to parse that the parse template is not designed to handle. When both subject and object are MANY, the number of subjects and objects within a particular scope are expected to match. Stray subjects and stray objects, such as "Bob" and "Cranberry" above, are not matched or emitted.

In addition to the features shown in the relationship above, an annotation feature is available, which will be discussed below.

A working example follows, which is based on Bill Gates's Twitter page, part of which is reproduced in FIG. 4. The full HTML for even an abbreviated list of Gates's 2.5 million followers takes many pages. FIG. 5 is a fragment that includes the beginning of the "following_list" 513 and a "vcard" for Gates's co-founder Paul Allen 521, 523, 531, 533. FIG. 7 shows a pair of one-to-one item lists for Paul Allen's contact URL 743, 745, 748 and his photo 751, 753, 755, 758. In the contact relation, Bill Gates 741 is followed by Paul Allen 745.

Figure 3:
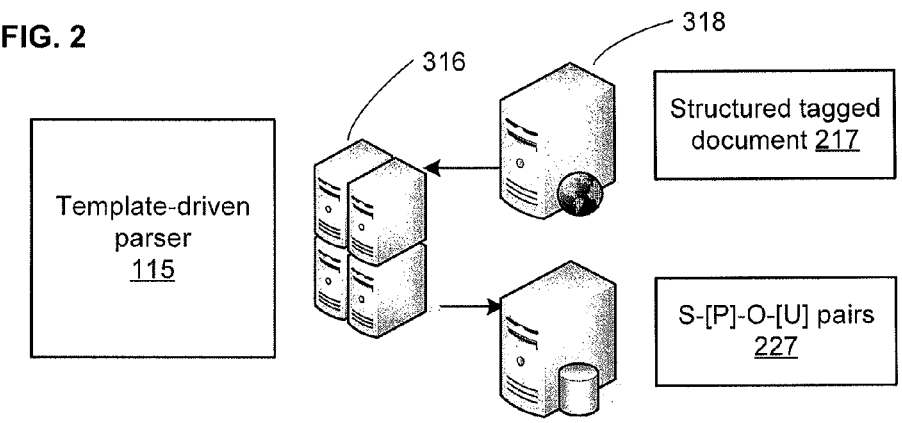
FIG. 3 is a high-level block diagram of components involved in generating the FIG. 7 output from the FIG. 4 Twitter page and FIG. 5 HTML code for the page.

FIG. 3 is a high-level block diagram of components involved in generating the sample output (FIG. 7) from the Twitter page (FIG. 4) and HTML code for the page (FIG. 5). A template-driven parser 115 is hosted on one or more processors 316, such as a workstation, server, server cluster or the like. The Twitter page is a structured tagged document 217 in HTML. It is hosted on Twitter's servers 318. The processors 316 directly or indirectly communicate with the processors 318. The template-driven parser 115 processes the structured tagged document 217. It outputs one-to-one relationship records 227, such as a list of Gates's followers and a list of photos for Gates and his followers. As described above, these one-to-one relationship records include a subject, predicate and object. Optionally, they include userdata and/or annotations. If only one list were being emitted, the predicate might be omitted, but with reduced readability. From this working example, we turn to a definition of an exemplary parser.

The following parser uses Google's Protocol Buffer code generator, which is described at code.google.com. A tutorial for C++ programmers can be found at code.google.com/apis/protocolbuffers/docs/cpptutorial.html. A language guide is found at code.google.com/apis/protocolbuffers/docs/proto.html. One nice feature of the Protocol Buffer tool is that it generates code in alternative formats, including C++, Java and Python. Other parser generators could be used without detracting from the power of the matching template that we describe, such as JSON or Thrift.

Users interact with the parsing framework in two ways: They write parsers, via the language mentioned above. Or, they parse documents, via the C++ framework.

The C++ API is provided by a class named XPaFParser. This class reads a generated XPaFParserDef C++ object (generated by the Protocol Buffer code generator) and implements the declarative parsing specification. An additional C++ class, XPaFParserMaster, owns a set of XPaFParser objects. At initialization time, this class constructs an XPaFParser object for each defined parser (e.g., by reading all parser definition files in some known file system location). Once all parsers have been constructed, the XPaFParserMaster is ready for action; it takes a document as input (typically in HTML or XML format) and checks whether any individual parsers "care" about the document. If so, it constructs an XPathWrapper object for the document (which is useful for XPath querying over the document) and then invokes relevant parsers. The relevant parsers extract data from the document in accordance with the parser's underlying specification.

The parser specification language uses a set of "relation templates" that indicate what should be parsed out of a given document. A relation template is composed of an object, a predicate, and a subject, as explained above. Each of these may be a string constant, or may be an XPath query that indicates how the corresponding field should be extracted from documents. One useful XPath implementation is the open source libxml2 from xmlsoft.org. More generally, alternative query languages that might be used in place of XPath include cssQuery; dojoQuery; XQL; and xQuery. We describe each of these query languages as using a matching pattern to define, within a scope identified by parsing the document, which document elements should be selected.

In a simplified implementation, objects and subjects may be XPath queries, but predicates are specified as string constants. In a fuller implementation, the predicates also may be XPath queries. This may be useful when list elements are of the same class, but have distinguishing features. Consider the source data:

```
<div>
    <span class="name1">Adam</span> played
    <span class="activity">soccer</span> with
    <span class="name2">George</span> on
    <span class="date">2011-03-31</span>
</div>
<div>
    <span class="name1">Susan</span> played
    <span class="activity">golf</span> with
    <span class="name2">John</span> on
    <span class="date">2011-04-14</span>
</div>
```

And the following relation template, which uses an XPath query to extract the name of the sport that the subject played with the object.

```
RelationTemplate {
    subject: "//span[@class='name1']"
    predicate: "//span[@class='activity']"
    object: "//span[@class='name2']"
    subject_cardinality: MANY
    object_cardinality: MANY
}
```

In this example, an annotation feature, explained later, could be used to extract the "date" attribute, which is the date on which the subject and object played the sport. The extracted date could be output as an annotation.

The specification language has various other features designed to expand functionality and simplify the process of writing a parser. A prototype parser language written in Protocol Buffer format is described below, as a narrative of the parser definition code.

Parser Definition Example

In this section, we walk through and explain an exemplary parser definition, written for the Protocol Buffer code generator, and some supplemental code examples. The parser definition begins with the package.
syntax="proto2";
package xpaf;

Queries are referenced by or defined in RelationTemplates, which typically appear following QueryDefs in templates.

Query strings can be embedded directly in RelationTemplates or globally defined in QueryDefs. The QueryDefs are useful for avoiding query duplication, for defining query scope, and for advanced features like extraction_regexp, which is explained later.

The query is named using the pattern "[A-Za-z]+", which could, of course, be varied in alternative implementations. A number of fields are defined, some required and others optional.

Queries are referenced in RelationTemplates via "% name %".

The extraction_regexp is a regular expression for extracting a value from the query result using the RE2::FullMatch( ) function provided by the RE2 library or a similar function provided by another regular expression library such as PCRE. For instance, if our XPath query produces strings of the form "Num friends: 1234", then extraction_regexp="Num friends: \\s*(\\d+)" will extract "1234".

```
message QueryDef {
    required string name=1;
    required string query=2;
    optional string extraction_regexp=3;
};
```

A QueryGroupDef defines a group of queries that, in a sense, share a DOM tree prefix (keeping in mind that alternative streaming implementations for the technology disclosed may not actually involve parsing the input document into a DOM tree). To ensure correctness, queries in MANY-to-MANY RelationTemplates should all belong to the same QueryGroupDef. Consider this example:

```
node: {
    name: "foo_1"
}
node: {
    name: "foo_2"
    img: "bar_a"
}
node: {
    img: "bar_b"
}
```

If one independently queried for all names and all imgs in this example, without taking scope into account, one would incorrectly associate foo__1 with bar_a. A scope definition in a QueryGroupDef is one way of avoiding this kind of mismatch. The name of a QueryGroupDef satisfies the pattern "[A-Za-z]+". Queries from within a group are referenced in RelationTemplates via % group_name.query_name %.

```
message QueryGroupDef {
    required string name=1;
    repeated string query_components=2;
    repeated QueryDef query_defs=3;
};
```

Repetition of components in the query path can be explained using the following example. For a multi-row, multi-column table, you might write:

query_components: "/html//table/tr"
    query_components: "/td"

When your parser encounters the following table:

```
<table>
  <tr>
    <td> column_1 </td>
    <td> column_2 </td>
  </tr>
  <tr>
    <td> only_one_column </td>
  </tr>
</table>
```

First, it will issue the following count query:
count(/html//table/tr)=>2
    Next, for each <tr>, it will issue another count query:
    count (/html//table/tr[0]/td)=>2
    count(/html//table/tr[1]/td)=>1
    For each of the three resulting 'td' nodes, it will run each query in query_defs.

There typically are multiple queries in a QueryGroupDef. Individual queries should be relative to the last component above, should include any "/" prefix chars, and return zero or one results.

Templates express parsed relations. Parsers emit {subject, predicate, object} triples specified by RelationTemplates. Alternatively, parsers could emit duples, quadruples or another size of tuple.

To use a QueryDef as a subject or object, wrap the query name in percent signs. For example:
    subject: "% url %"
    predicate: "follows"
    object: "% friend url %".

XPath queries alternatively may be inline. Any subject or object whose name starts with "/" is assumed to be a query. In extended implementations, predicates also may contain queries.

Relations may also contain {name, value} annotations, where 'name' is a string literal and 'value' may be a literal, reference, or inline query.

Subject, object, and annotation values each have an associated cardinality, either ONE or MANY, as introduced above. Those with cardinality MANY all produce the same number of results, N. Those with cardinality ONE must produce zero or one results and will be duplicated for each of the N relations, when ONE and MANY are mixed. For example, if subject has cardinality ONE and object has cardinality MANY, we output one relation per object, duplicating the subject for each relation. On the other hand, if both have cardinality MANY, we require that they produce the same number of results, N, and we emit N relations.

If either subject or object violates cardinality specifications, some emission of relations is skipped. If an annotation violates these rules, just that annotation is skipped; the relations are still emitted.

The routine ComputeNumRelations( ) determines the number of relations to emit for a particular RelationTemplate, given the result counts and cardinalities of subject, object, and annotation values. The number of relations relates to the number of results in the first cardinality-MANY query in {subject, object, annot_1, annot_2, . . . }. The following corner cases may be taken into account: If either subject or object has cardinality ONE and num results !=1, then this is an error and no relations are emitted. If subject and object both have cardinality MANY but have different numbers of results, no relations need be emitted. Any annotation with cardinality ONE and num results !=1, or with cardinality MANY and num results !=num_relations (as determined above), may be skipped and not emitted.

Here are RelationTemplate and AnnotationTemplate definitions:

```
message RelationTemplate {
    required string subject = 1;
    required string predicate = 2;
    required string object = 3;
    enum Cardinality {
        ONE = 0;
        MANY = 1;
    }
    required Cardinality subject_cardinality = 4;
    required Cardinality object_cardinality = 5;
    message AnnotationTemplate {
        required string name = 1;
        required string value = 2;
        required Cardinality value_cardinality = 3;
    };
    repeated AnnotationTemplate annotation_tmpls = 6;
    optional string userdata = 7;
    optional string url_regexp = 8;
};
```

When subject cardinality and object cardinality are both MANY, it is recommended that 'subject' and 'object' belong to the same QueryGroupDef, for reasons described above. Similarly, if 'value' in the AnnotationTemplate is MANY, we recommend that 'value' belong to the same QueryGroupDef as anything else with cardinality MANY.

A userdata literal string is copied verbatim into each resulting relation. For example, applications that differentiate between "edge" relations and "attribute" relations can use this field to specify the relation type. An annotation matching pattern can be used to emit association output, as described below in the discussion of FIGS. 10-11.

If the option url_regexp is set, the parser limits output to relations for urls that match url_regexp using the RE2::PartialMatch( ) function provided by the RE2 library or a similar function provided by another regular expression library such as PCRE. This method is a regular expression matcher implemented in the open-source RE2 C++ regular expression library, which can be accessed at code.google.com. The regular expression will "partially match" a given string if it matches any substring within the input string.

There are two additional options that may be implemented to further enhance this technology:
    // optional int32 max_instances=9 [default=-1];
    // optional int32 min instances=10 [default=-1];

Optionally, we could specify minimum and maximum instances variables in order to better detect whether the document was parsed correctly. For example, the set of documents the parser was written for may be known to have no more than 20 and no less than 3 relationships. If the parser encounters documents that violate these conditions, then it is likely that the parser is being used on a different data set than it was intended to be used for. The condition encountered can be flagged for manual inspection.

With this definitional code in place, it takes only a few lines to define parsers in the Protocol Buffer language.

```
message XPathParserDef {
    required string parser_name=1;
    optional string url_regexp=3;
    repeated QueryDef query_defs=4;
    repeated QueryGroupDef query_group_defs=5;
    repeated RelationTemplate relation tmpls=6;
    optional string userdata=7;
};
message XPathParserDefs {
    repeated XPathParserDef parser_defs=1;
};
```

If the url_regexp field is set, ShouldParse(url) will only return true if url matches url_regexp using the RE2::PartialMatch( ) function provided by the RE2 library or a similar function provided by another regular expression library such as PCRE. Parse(url) does not check url_regexp.

In the definition of a particular parser, the QueryDef item is for individual queries. The QueryGroupDef is for query groups. The RelationTemplate defines relations that this parser outputs. Userdata is a string available and associated with the parser definition, in addition to the parser_name. Multiple parsers can be defined.

FIG. 1 is a high-level block diagram of the flow and devices that process this parser definition. The parser definition 111 explained above is submitted to the Protocol Buffer code generator 113, which generates code 115 that can process one or more parser templates 211. Each resulting C++ XPaFParserDef object is then handed to an XPaFParser, which implements the declarative parser specification. This process is carried out by a specially adapted computing device 133 such as a workstation, server, server cluster or the like.

Twitter Example

In this section, we walk through the Twitter example in further detail.

Figure 2:
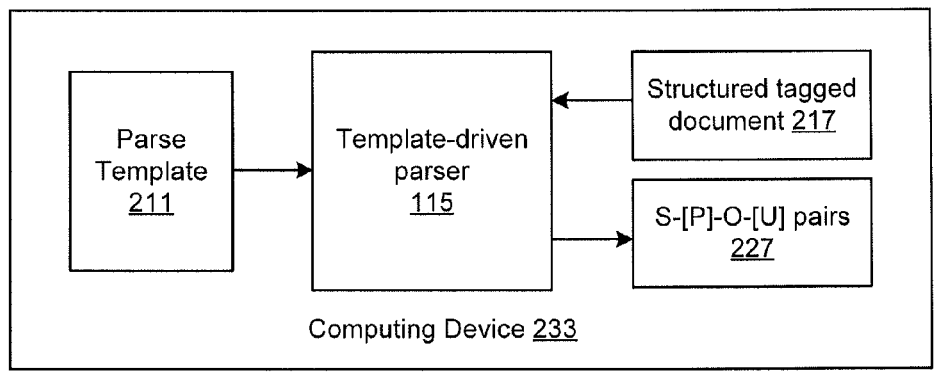
FIG. 2 is a high-level block diagram of the flow and devices that process parse templates.

FIG. 2 is a high-level block diagram of the flow and devices that process parse templates 211, such as depicted in FIGS. 6 and 9. A template-driven parser 115 running on a specially adapted computing device 233 accesses the Twitter page (e.g., FIGS. 4-5), which is a structured tagged document 217 in HTML. The template-driven parser 115 processes the structured tagged document 217. It outputs one-to-one relationship records 227, such as a list of Gates's followers and of photos for Gates and his followers. As described above, these one-to-one relationship records include at least a subject and object. Optionally, they include a predicate and userdata.

FIG. 6 is a sample set of parser templates, including sections for QueryGroupDefs 610 and Relations 640, used in this sample to extract lists of contacts 641-648 and photos 651-658. The QueryGroupDefs define a search scope 613 and reusable search patterns 623, 633. The QueryGroupDefs includes a group name 611 and a scope definition 613 that is referenced by this name. The scope definition in this sample says that patterns qualified as being found in the "friend" group 611 are within a <div> tagged section of an HTML document that has a <div> id of "following_list". Compare 613, 513.

There are two sample QueryDefs named "url" 621 and "photo" 631. The corresponding XPath matching patterns 623, 633 match an HTML encoded url and image, respectively. On Twitter pages, these images may be photos or arbitrary graphics. These QueryDefs are reusable in the Relations section 640 of the template. Two RelationTemplates 641, 651 appear in the sample, for extracting lists of contacts 643 and photos 653. Each template includes a subject 641, 651; a predicate 643, 653; an object 645, 655; cardinality enumerations for subject and object 647, 657; and a userdata value 648, 658. Some of these entries could be omitted, as described above. In the respective subject lines 641, 651, the matching patterns are indirectly referenced by % url % and % friend.url %. In this sample syntax, the leading and trailing percent signs indicate a variable name that can be found among the QueryDefs. The referenced variables for matching patterns can be unqualified or qualified by a named scope 611. Other details of the predicate, cardinality and userdata are provided above.

FIG. 7 is sample output produced by applying the template in FIG. 6 to the HTML in FIG. 5. The first relation output 741-748 is a one-to-one contact relationship between Bill Gates and Paul Allen. The output subject 741 is selected by applying the % url % 651 referenced search pattern 621, 623. Not shown is the Bill Gates URL for the page in FIG. 4, which matches the output subject 741. The predicate "contact" 743 is a literal 643 in the template. The output object 745 is selected using a qualified search pattern 645, 621 that has a nested tag syntax. The string "href" 521 within the <a> tag satisfies the search pattern, resulting in the follower's URL 523 being selected. The userdata "edge" 748 is another literal 648 in the template.

The photo list output 751-758 is similarly selected by applying the photo RelationTemplate 651-658 to parts of Paul Allen's vcard. The string "href" 521 satisfies the search pattern 621 and the href 523 is selected, this time as a subject instead of an object. The predicate "photo" 753 is a literal 653 in the template. The output object 755 is selected using a qualified search pattern 655, 633 that has a nested tag syntax. The string "src" 531 within the <img> tag nested within the <a> tag satisfies the search pattern, resulting in the image source 533 being selected. The userdata "attr" 758 is another literal 658 in the template.

While this sample depicts an HTML document, the technology disclosed is just as easily applied to other hierarchically structured documents in markup languages that use tags to identify elements, such as XML and its variants. Markup languages that are compatible with style sheets generally can make use of the technology disclosed.

Sports Example

FIGS. 8-9 provide a second example, in which an XPath search pattern is used to select a predicate. The source file in FIG. 8 represents Adam 841 playing soccer 843 with George 845 on Mar. 31, 2011 846, and Susan 851 playing golf 853 with John 855 on Apr. 14, 2011 856. Each "playing" is in a separate <div>.

The RelationTemplate in FIG. 9 executes correctly without a QueryGroupDefs scope limitation 613, because each <div> is complete, including all four elements being selected. The subject 941, object 945 and cardinality 947 elements are like those in FIG. 6. The predicate 943 is a search pattern, instead of a literal. When output, the predicate field will name the activity played, as an attribute of the one-to-one relationship between player 1 and player 2. Extending this model, another line could be added after 946 that would select on the class name "date" to create an annotation field so that a quadruple would be output.

Annotation Example

FIGS. 10-11 illustrate an annotation feature of this technology. Consider the following sample data, which would reside in a tagged document such as an HTML page or an XML document:

| Person | Fruit  | Year | Rating |
|--------|--------|------|--------|
| Adam   |        |      |        |
|        | Apple  | 2002 | 4      |
|        | Banana | 2003 |        |
|        | Cherry | 2003 | 4      |
|        | Durian |      | 5      |

There is one person, Adam. There are four fruits and one or two annotations per fruit. Some annotations are years (2002 or 2003) and others are ratings (4 or 5). FIG. 10 is a declaratory parser definition that can be applied to the sample data, when the data is found in a tagged document. FIG. 11 is exemplary output from applying FIG. 10 to the sample data. In FIG. 10, the QueryGroupDef 1010 named "v" 1011 includes three QueryDefs 1021, 1031, 1041, each of which is named and sets forth a search pattern.

The fruit QueryDef 1021 is invoked as the object of the first RelationTmpls 1050 and as the subject of the second and third RelationTmpls 1060, 1070. This QueryDef is an example of using cardinalities for subject, object and annotation of ONE-MANY-MANY, with corresponding results 1150 in FIG. 11.

The date QueryDef 1031 is invoked as an annotation for the first RelationTmpls 1050, the object of the second RelationTmpls 1060, and the subject of the third RelationTmpls 1070. This QueryDef is an example of using cardinalities of MANY-MANY-MANY, with corresponding results 1160.

The rating QueryDef 1041 is invoked for annotations. This example has cardinalities for subject, object and annotation of MANY-MANY-ONE, with corresponding results 1170.

In FIG. 11, we see four relations 1150 with fruit objects. They all have annotations: banana has a date, durian has a rating, and apple and cherry are annotated with date and rating. There are three relations 1160 with date objects, two of which are annotated with ratings. There are also three relations 1170 with date subjects and fruit objects.

Some Particular Embodiments

The technology disclosed can be practiced as a method, device or article of manufacture directed to efficiently extracting relationship information from a hierarchically structured document that uses tag elements. Examples of hierarchically structured documents that use tag elements are HTML, XML and variations on XML. The method, device and article of manufacture are computer oriented, not for execution using pen and paper.

One method that implements the technology disclosed begins with receiving at least one declarative specification in a parsing rule template, wherein the declarative specification includes at least a subject, object and predicate. The declarative specification declares a pair of pattern matching specifications that identify text associated with pairs of the subject and the object. The method further includes applying the pattern matching specifications in the template to select and output one or more pairs of the subject and the object found in a web page or XML document.

Practicing this method, the pattern matching specifications may be compliant with the XPath standard. Alternatively, they may be consistent with other technologies described above. The method typically is extended by including multiple declarative specifications in a parsing rule template. Each declarative specification includes the subject, object and predicate.

The predicates mentioned may be a literal that expresses a relationship captured by a particular declarative specification or may use a pattern matching specification to identify text associated with the predicate. Either the literal predicate or text identified using the predicate matching pattern specification can be output with the pairings of the subject-object instances.

This method can be further extended by including one or more annotations. The annotations, like the predicate field, may be populated with either a literal or text identified using a pattern matching specification. The annotations can be output with pairings of the subject-object instances. They may be combined with subject, predicate and object to output at least quadruples.

This method also can be extended by including a userdata field. The userdata field is populated with literal text. The userdata field can be output with pairings of the subject-object instances. It may be combined with subject, predicate and object to output at least quadruples, or in addition to annotations, to produce at least quintuples.

The declarative specification can further include a pair of cardinality specifications for the subject and the object. These cardinality specifications typically describe whether the subject and the object are each expected one time or are expected zero to many times.

Another enhancement to the method further includes specifying a scope pattern in the parsing rule template that identifies how closely the subject and object must be found together. HTML and XML are examples of hierarchically structured markup languages that use tags to contain elements. The scope pattern may be expressed in terms of the tags that contain elements in such hierarchically structured markup languages. Optionally, the scope pattern may reference multiple levels of nested tags in the hierarchically structured document markup language.

Alternatively, enhancement of the method may include specifying a proximity limitation in the parsing rule template that defines how closely the subject and object must be found together. Optionally, the proximity limitation may reference multiple levels of nested tags in a hierarchically structured document markup language.

The technology disclosed also may be practiced as a template-driven parser device. This parser device parses hierarchically structured documents. It includes at least one memory and at least one processor coupled to the memory. It further includes at least one declarative specification of a parsing rule template. The declarative specification includes at least the subject, object and predicate. The declarative specification declares a pair of pattern matching specifications that identify text associated with pairs of the subject and the object. The device further includes an input module running on the processor that receives in the memory at least one hierarchically structured document that uses tags to contain elements. A parsing module running on the processor is responsive to the parsing rule template. It applies the pattern matching specifications in the template to select text from a hierarchically structured document and output one or more one-to-one pairings of instances found in the hierarchically structured document that the subject and the object pattern matching specifications.

As with the method above, in this device, the pattern matching specifications may be compliant with the XPath standard. Alternatively, they may be consistent with other technologies described above. The multiple declarative specifications typically are grouped together in a parsing rule template. Each declarative specification in the parsing rule template includes the subject, object and predicate.

As described above, the predicates mentioned may be a literal or may use a pattern. The parsing rule template can be further extended by including a userdata field. And, the declarative specification can further include cardinality specifications for subject and object and, optionally, for annotation.

Another enhancement to the parsing rule template specifies a scope pattern in the parsing rule template that identifies how closely the subject and object must be found together. HTML and XML are examples of hierarchically structured markup languages that use tags to contain elements. The scope pattern may be expressed in terms of the tags that contain elements in such hierarchically structured markup languages. Optionally, the scope pattern may reference multiple levels of nested tags in the hierarchically structured document markup language.

Alternatively, an enhanced parsing rule template may specify a proximity limitation that defines how closely the subject and object must be found together. Optionally, the proximity limitation may reference multiple levels of nested tags in a hierarchically structured document markup language.

The technology disclosed also may be practiced as an article of manufacture. This article of manufacture includes a non-transitory memory that stores computer instructions. In one implementation, the computer instructions, when run on suitable hardware, perform any of the methods described herein. In another implementation, the computer instructions, when combined with suitable hardware, produce one of the devices described herein.

I claim as follows:

1. A method of efficiently extracting relationship information from an HTML web page or XML document that has tagged elements, including:
    receiving electronically a relationship template that includes at least one declarative specification and a scope pattern, wherein the declarative specification includes at least a subject and an object that together define a relationship, and declares a pair of pattern matching specifications to identify text associated with pairs of the subject and the object, and wherein the scope pattern defines how closely the subject and the object are found together in a hierarchically structured document that uses tags that contain elements, wherein the scope pattern is expressed in terms of the tags that contain the elements; and
    applying the pattern matching specifications and the scope pattern in the relationship template to select and output one or more one-to-one pairs of the subject and the object found in a web page or XML document.

2. The method of claim 1, further including multiple declarative specifications in the relationship template, each declarative specification including least a subject and an object.

3. The method of claim 2, wherein a particular declarative specification further includes a predicate and a further pattern matching specification to identify text associated with the predicate for the particular declarative specification and the output pairs of the subject and the object include text that matches the further pattern matching specification for the predicate.

4. The method of claim 3, wherein the particular declarative specification further includes one or more annotations and additional pattern matching specifications to identify text associated with the annotations for the particular declarative specification and the output pairs of the subject and the object include text that matches the additional pattern matching specifications for the annotations.

5. The method of claim 4, further including in the declarative specification cardinality specifications for the subject, the object and the annotations, wherein the cardinality specifications describe whether the subject, the object and the annotations are expected zero or one time or expected zero to many times.

6. The method of claim 4, further including specifying the scope pattern in the relationship template to define how closely the subject, the object and the annotations must be found together in the hierarchically structured document that uses tags that contain elements.

7. The method of claim 6 wherein the scope pattern references multiple levels of nested tags in the hierarchically structured document.

8. The method of claim 1, wherein the declarative specification further includes a predicate, wherein the predicate is a literal that expresses the relationship captured by the subject and object of the declarative specification.

9. The method of claim 8, wherein the literal predicate is output with the one-to-one pairs of the subject and the object.

10. The method of claim 1, further including in the declarative specification cardinality specifications for the subject and the object, wherein the cardinality specifications describe whether the subject and the object are expected zero or one time or expected zero to many times.

11. The method of claim 10, further including using the cardinality specifications to define whether numbers of subjects and objects located during parsing are within design parameters of the declarative specification.

12. An article of manufacture including a non-transitory memory impressed with computer instructions that, when used to specially configure hardware, will cause the specially configured hardware to:
    receive electronically a relationship template that includes at least one declarative specification and a scope pattern, wherein the declarative specification includes at least a subject and an object that together define a relationship, and declares a pair of pattern matching specifications to identify text associated with pairs of the subject and the object, and wherein the scope pattern defines how closely the subject and the object are found together in a hierarchically structured document that uses tags that contain elements, wherein the scope pattern is expressed in terms of the tags that contain the elements; and
    apply the pattern matching specifications and the scope pattern in the relationship template to select and output one or more one-to-one pairings of instances of the subject and the object found in a web page or XML document.

13. A parser device that parses hierarchically structured documents, including:
    at least one memory;
    at least one processor coupled to the memory;
    a relationship template, stored in the memory, that includes at least one declarative specification and a scope pattern, wherein the declarative specification includes at least a subject and an object that together define a relationship, and declares a pair of pattern matching specifications to identify text associated with pairs of the subject and the object, and wherein the scope pattern defines how closely the subject and the object are found together in a hierarchically structured document that uses tags that contain elements, wherein the scope pattern is expressed in terms of the tags that contain the elements;

an input module running on the processor that receives into the memory at least one hierarchically structured document that uses tags that contain elements; and a parsing module running on the processor responsive to the relationship template that applies the pattern matching specifications and the scope pattern in the relationship template to select text from the hierarchically structured document and to output one or more one-to-one pairings of instances of the subject and the object found in the hierarchically structured document.

14. The device of claim 13, further including multiple declarative specifications in the relationship template, each declarative specification including least a subject and an object.

15. The device of claim 14, wherein a particular declarative specification further includes a predicate, wherein the predicate is a literal that expresses a relationship captured by a particular declarative specification.

16. The device of claim 15, wherein the parsing module outputs the literal predicate with the one-to-one pairs of the subject and the object.

17. The device of claim 14, wherein a particular declarative specification further includes a predicate and a further pattern matching specification to identify text associated with the predicate for the particular declarative specification and the output pairs of the subject and the object include text that matches the further pattern matching specification for the predicate.

18. The device of claim 17, wherein the particular declarative specification further includes one or more annotations and additional pattern matching specifications to identify text associated with the annotations for the particular declarative specification and the output pairings of the instances include text that matches the additional pattern matching specification for the annotations.

19. The device of claim 18, further including in the declarative specification cardinality specifications for the subject, the object and the annotations, wherein the cardinality specifications describe whether the subject, the object and the annotations are expected one time or expected zero to many times.

20. The device of claim 18, wherein the scope pattern defines how closely the subject, the object and annotations must be found together in the hierarchically structured document that uses tags that contain elements.

21. The device of claim 20, wherein the scope pattern references multiple levels of nested tags in the hierarchically structured document.

22. The device of claim 13, further including in the declarative specification cardinality specifications for the subject and the object, wherein the cardinality specifications describe whether the subject and the object are expected one time or expected zero to many times.

23. The device of claim 22, wherein the cardinality specifications define whether numbers of subjects and objects located during parsing are within design parameters of the declarative specification.

\* \* \* \* \*